United States Patent [19]

Ogawa et al.

[11] Patent Number: 5,410,437
[45] Date of Patent: Apr. 25, 1995

[54] APPARATUS FOR RECORDING AND/OR REPRODUCING AN INFORMATION SIGNAL, A PCM SIGNAL AND A VIDEO SIGNAL IN A HELICAL TRACK ON A RECORDED MEDIUM AND SUPERIMPOSING CHARACTER SIGNALS ON THE VIDEO SIGNAL

[75] Inventors: Kazuyuki Ogawa; Hiroshi Yamazaki, both of Kanagawa; Hirotsugu Ohkubo, Tokyo, all of Japan

[73] Assignee: Sony Corporation, Tokyo, Japan

[21] Appl. No.: 83,884

[22] Filed: Jun. 24, 1993

Related U.S. Application Data

[63] Continuation-in-part of Ser. No. 854,400, Mar. 19, 1992, abandoned.

[30] Foreign Application Priority Data

Mar. 31, 1991 [JP] Japan ................................. 3-93389

[51] Int. Cl.⁶ .................... G11B 15/12; G11B 27/02
[52] U.S. Cl. ............................... 360/61; 360/14.1
[58] Field of Search ................ 360/36.1, 19.1, 14.1, 360/14.2, 14.3, 61, 64, 48, 32; 358/335, 343

[56] References Cited

U.S. PATENT DOCUMENTS

| | | | |
|---|---|---|---|
| 4,418,364 | 11/1983 | Wine | 358/335 X |
| 4,656,536 | 4/1987 | Furumoto et al. | |
| 4,740,845 | 4/1988 | Kashida et al. | |
| 4,799,111 | 1/1989 | Ito | 360/19.1 X |
| 5,016,120 | 5/1991 | Okada et al. | 360/19.1 X |
| 5,097,348 | 3/1992 | Suetaka | |
| 5,115,324 | 5/1992 | Tokimoto et al. | 358/335 |
| 5,134,498 | 7/1992 | Yokoyama | |
| 5,220,411 | 6/1993 | Kitaura et al. | 358/337 X |
| 5,233,438 | 8/1993 | Kanota | 360/19.1 X |
| 5,276,560 | 1/1994 | Saito et al. | 360/19.1 |
| 5,287,196 | 2/1994 | Yamashita et al. | 360/19.1 X |

*Primary Examiner*—Donald Hajec
*Assistant Examiner*—Thien Minh Le
*Attorney, Agent, or Firm*—William S. Frommer; Alvin Sinderbrand

[57] ABSTRACT

A signal recording and/or reproducing apparatus, such as a video tape recorder or the like, records and/or reproduces an information signal indicating a date of recording, a video signal and a PCM signal from a helical track on a record medium, such as a magnetic tape. The track has first and second portions which respectively record the PCM signal and the video signal. In certain advantageous embodiments, the information signal is recorded in a guard band area between the first and second portions of the track. The apparatus has the capability of selectively superimposing the date information on the video signal for display. A record medium in which a plurality of such helical tracks are formed may be searched to locate signals recorded on a selected date, thus providing a convenient search capability which is implemented in a simple and straightforward manner.

15 Claims, 8 Drawing Sheets

FIG. 1

| CONDITION | | DATA |
|---|---|---|
| EVEN INTERVAL | EVEN FRAME | TIME CODE (T) |
| | | TIME CODE (T) |
| | ODD FRAME | YEAR/MONTH/DAY (P) |
| | | HOUR/MINUTE/SECOND (N) |
| ODD INTERVAL | EVEN FRAME | HOUR/MINUTE/SECOND (N) |
| | | YEAR/MONTH/DAY (P) |
| | ODD FRAME | TIME CODE (T) |
| | | TIME CODE (T) |

| CONDITION | | DATA |
|---|---|---|
| EVEN SECOND | EVEN FRAME | TIME CODE |
| | | TIME CODE |
| | ODD FRAME | YEAR/MONTH/DAY |
| | | HOUR/MINUTE/SECOND |
| ODD SECOND | EVEN FRAME | HOUR/MINUTE/SECOND |
| | | YEAR/MONTH/DAY |
| | ODD FRAME | TIME CODE |
| | | TIME CODE |

APPARATUS FOR RECORDING AND/OR REPRODUCING AN INFORMATION SIGNAL, A PCM SIGNAL AND A VIDEO SIGNAL IN A HELICAL TRACK ON A RECORDED MEDIUM AND SUPERIMPOSING CHARACTER SIGNALS ON THE VIDEO SIGNAL

BACKGROUND OF THE INVENTION

The present application is a continuation-in-part of U.S. patent application Ser. No. 07/854,400, filed Mar. 19, 1992, now abandoned.

The present invention generally relates to signal recording and/or reproducing apparatus, such as video tape recorders (VTR's) and the like which form helical recording tracks in sequence on a magnetic tape for recording a video signal, a PCM (pulse code modulation) signal and an information signal.

U.S. Pat. No. 4,551,771, assigned to the assignee of the present application, describes a helical scan video tape recorder in which PCM audio signals are recorded in first portions of sequentially arranged helical tracks which also record color under video signals in second portions thereof longitudinally displaced from the first portions. Alternate ones of the tracks are sequentially scanned by respective ones of a pair of magnetic recording heads mounted at diametrically opposed positions on a rotating drum. In order to form the predetermined first and second portions of each track, each head is provided with the PCM audio signal and the video signal in time multiplexed fashion. The tape is wound about 210 degrees of the drum's circumference so that each of the heads is operative to scan the tape during the corresponding 210 degrees of the drum's rotation. During the first 30 degrees of each scan, each head records the PCM audio signal in the first portion of the track, while during the remaining 180 degrees of the scan the head records a corresponding video signal. This eliminates the need to record audio signals in a separate longitudinal track with the use of a fixed recording head.

U.S. Pat. No. 5,016,120, assigned to the assignee of the present application, describes apparatus for recording a plurality of different PCM audio signal segments on a slant track of a helically scanned tape, as well as an apparatus for recording a PCM audio signal together with a video signal in helically scanned tracks on a tape. An index signal is recorded in an index area of each track provided at a position across a rear back margin and guard area of each PCM audio signal segment and a run-in area of the succeeding segment. This avoids the need to provide a separate longitudinal track for recording an index signal used to detect the beginning of a desired recorded program. The index signal takes the form of a constant frequency modulated to provide an encoded signal.

U.S. Pat. No. 4,791,497, also assigned to the assignee of the present application, relates to an apparatus for recording and/or reproducing a video signal and a PCM audio signal together with an index signal in slant tracks on a magnetic tape by means of a rotary head. The index signal may be recorded in a postamble or guard band area following the PCM recording area of the track and is used, for example, to indicate the address of the starting point of a recorded program or event. In certain embodiments, the index signal is comprised of a signal indicative of a starting point of a recorded event or program in a channel, the channel number, or hour, minute and second data.

VTR's incorporating the teachings of the foregoing patents have been provided heretofore integrated with an image pickup apparatus in a miniaturized enclosure which is readily portable. Such VTR's are provided with the capability of recording the time and date of image recording in the form of alphanumeric characters superimposed on the recorded image. However, since the time and date information thus become a permanent part of the recorded image signal, such information must always be displayed along with the image.

Since the apparatus is miniaturized, it provides a convenient means of producing a video record of a vacation or the like. Accordingly, the user may record several days of video and sound information on a single magnetic tape, for example, a tape having a two hour recording capability. It is also possible that recordings may be made on a single tape at various times throughout the year, and even during different years. It will be appreciated, therefore, that the user may wish subsequently to access the information recorded on a desired date for viewing. However, in the conventional apparatus, the user must then carry out the search by actually viewing the date information permanently recorded as a part of the video signal on the tape.

OBJECTS AND SUMMARY OF THE INVENTION

Accordingly, it is an object of this invention to provide an apparatus for recording and/or reproducing an information signal, a video signal and a PCM signal recorded by a rotary head in a helical track on a magnetic tape which avoids the abovementioned shortcomings associated with the prior art.

It is a further object of this invention to provide such an apparatus in which a recording may be searched by reproducing an information signal recorded in a helical recording track without adversely affecting other signals recorded therein, such as by superposition thereon or otherwise.

Another object of the present invention is to provide the ability to selectively superimpose information including a date of recording on a video signal reproduced from a helical track on a magnetic tape.

A further object of the present invention is to provide a signal recording and/or reproducing apparatus in which a video signal recorded on a desired date may be accessed in a convenient fashion utilizing only the date information.

In accordance with an aspect of the present invention, an apparatus for reproducing an ancillary information signal, a video signal and a PCM signal recorded by a rotary head in a helical track on a magnetic tape, said video signal being recorded in a first portion of the helical track and the PCM signal being recorded in a second portion of the helical track other than the first portion, the ancillary information signal including a date signal indicating a date on which at least one of the PCM signal and the video signal were recorded, comprises: video playback means for reproducing said video signal from said helical track; information playback means for reproducing said ancillary information signal from said helical track; character generator means for generating character signals in response to the reproduced ancillary information signal; first means for superimposing the character signals on the video signal; and second means for selectively controlling the superposition of the character signals on the video signal by the first means.

In accordance with another aspect of the present invention, an apparatus for reproducing an ancillary information signal, a PCM signal and a video signal recorded by a rotary head in each of a plurality of helical tracks on a magnetic tape, the video signal being recorded in a first portion of each of the plurality of helical tracks and the PCM signal being recorded in a second portion of each of the plurality of helical tracks, the ancillary information signal including a date signal indicating a date on which at least one of the PCM signal and the video signal were recorded, comprises: video processor means for reproducing the video signal from the plurality of helical tracks; marker processor means for reproducing the ancillary information signal from the plurality of helical tracks to obtain the date signal therefrom; and control means for searching a desired position on the magnetic tape based upon the date signal obtained by the marker processor means.

In accordance with a further aspect of the present invention, an apparatus for recording and reproducing an ancillary information signal, a video signal and a PCM signal recorded by a rotary head in a helical track on a magnetic tape, the video signal being recorded in a first portion of the helical track and the PCM signal being recorded in a second portion of the helical track other than the first portion, the ancillary information signal including a date signal indicating a date on which at least one of the PCM signal and the video signal are recorded, comprises: information generator means for generating the ancillary information signal; switch means for supplying the PCM signal, the video signal and the ancillary information signal time-divisionally to the rotary head; switch control means for controlling the switch means to supply the ancillary information signal to the rotary head so that the rotary head is operative to record the ancillary information signal in a third portion of the helical track between the first portion and the second portion thereof; video playback means for reproducing the video signal from the helical track; information playback means for reproducing the ancillary information signal from the helical track; character generator means for generating character signals in response to the reproduced ancillary information signal; first means for superimposing the character signals on the reproduced video signal; and second means for selectively controlling the superposition of the character signals on the reproduced video signal by the first means.

The above, and other objects, features and advantages of the invention, will be apparent in the following detailed description of certain illustrative embodiments thereof which is to be read in connection with the accompanying drawings forming a part hereof, and wherein corresponding parts and components are identified by the same reference numerals in the several views of the drawings.

DETAILED DESCRIPTION OF A PREFERRED EMBODIMENT

Figure 1:
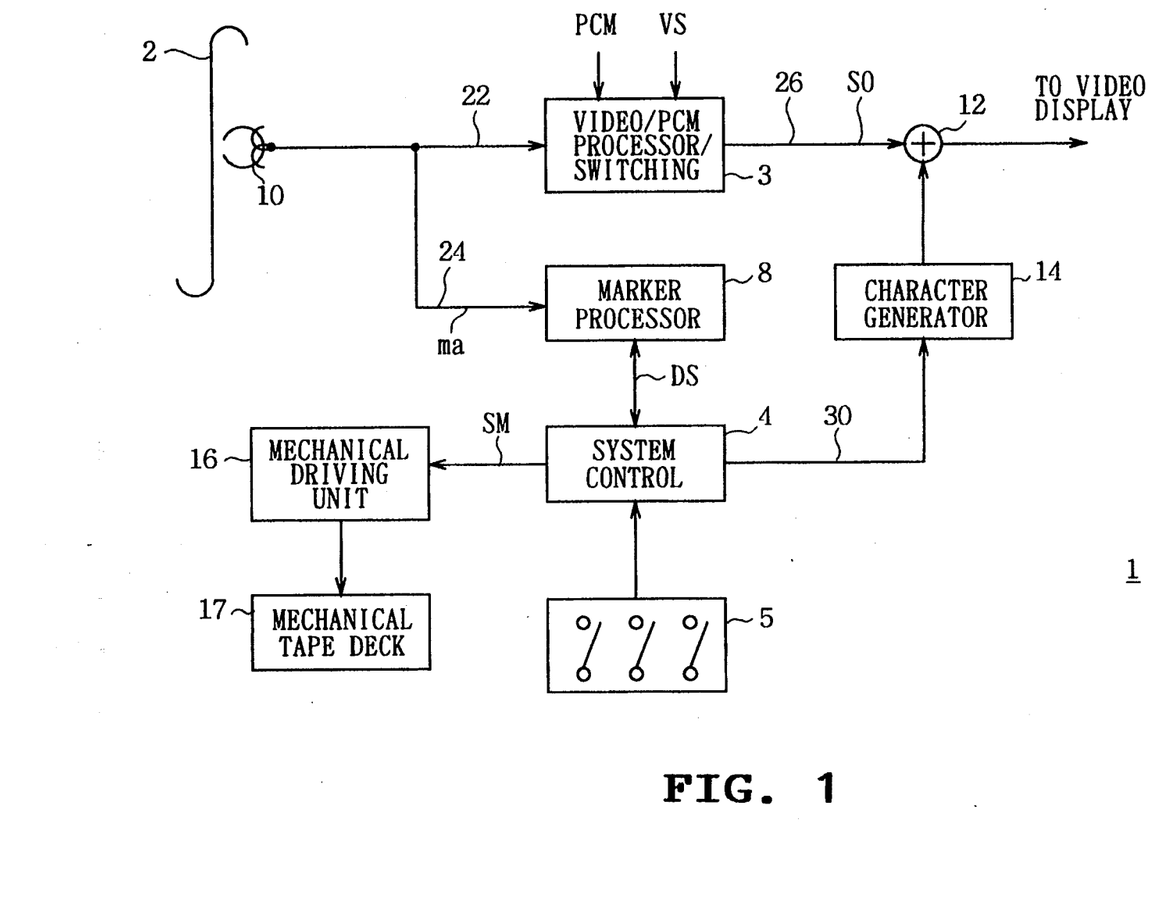
FIG. 1 is a block diagram of a VTR according to one embodiment of the present invention.

Referring to the drawings in detail, and presently to FIG. 1 thereof, a VTR 1 includes a rotary magnetic recording/reproducing head assembly 10 for recording or reproducing signals in helical recording tracks formed obliquely in sequence on a magnetic tape 2. A video signal/PCM audio signal processing and switching circuit 3 has a first input for receiving a video signal VS and a second input for receiving a PCM audio signal PCM and is operative to convert the signals VS and PCM into respective recording signals for recording on the tape 2 in respective portions of each of the helical recording tracks. For this purpose, the circuit 3 includes suitable switching circuitry for outputting the signals VS and PCM in time divisional fashion via an output terminal 22 coupled with the head assembly 10.

A marker processing circuit 8 is operative to generate a marker signal ma which is provided via an output terminal 24 thereof to the head assembly 10 for recording in a portion of each of the helical tracks of the tape 2 other than the portions thereof in which the signals VS and PCM are recorded and, for this purpose, incorporates suitable switching circuitry for outputting the marker signal ma in time divisional fashion with the video signal VS and the PCM audio signal for recording by the head assembly 10.

The marker signal ma is produced by the marker processing circuit 8 by modulating a recording signal with time code information, recording date, and recording time information (collectively, DS in FIG. 1) supplied thereto by a system control circuit 4. The system control circuit 4 produces the information DS in response to recording date and recording time information input manually by a user through actuation of one or more manual controls forming a part of an operation unit 5 coupled with the circuit 4.

Figure 2A:
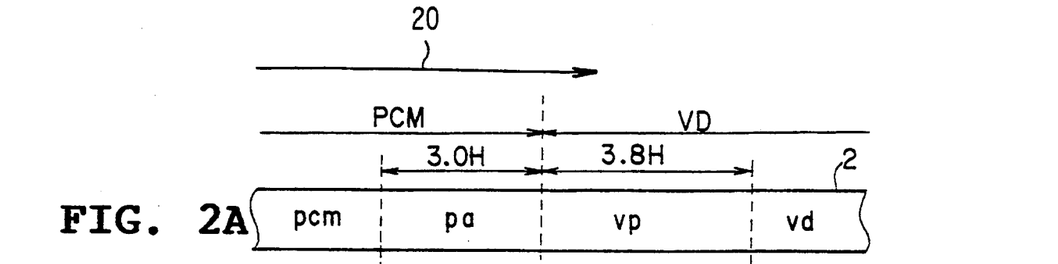
FIGS. 2A through 2E illustrate a format for recording a marker signal together with a PCM signal and a video signal in a helical track on a magnetic tape with the use of the embodiment of FIG. 1.

FIGS. 2A-2E illustrate a format for recording the video signal VS, the PCM audio signal and the marker signal ma in different respective areas of each helical track arranged longitudinally along an exemplary one of the recording tracks scanned by the head assembly 10 in the direction indicated by the arrow 20. With reference first to FIG. 2A, an area designated PCM beginning at the longitudinal extremity of the track first scanned by the head assembly 10 is designated for recording the PCM audio signal. After the head assembly 10 has scanned the area PCM, it scans an area designated VD extending from the area PCM to the opposite longitudinal extremity of the track and in which a video signal vd is recorded.

The PCM audio signal is recorded in a portion of the area PCM designated pcm in FIG. 2A which terminates at a position 3.0 horizontal intervals [H] from the boundary between the areas PCM and VD. The video signal vd is recorded in a portion vd of the video signal recording area VD commencing 3.8 [H] from the boundary between the areas PCM and VD, so that a predetermined guard band area is defined between the PCM audio signal recording area pcm and the area vd in which the video signal is recorded.

Figure 2B:
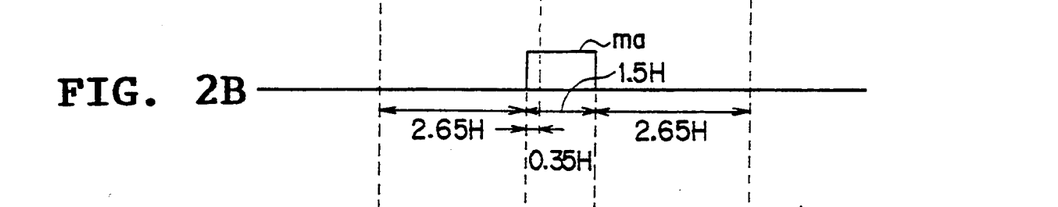
Figure 2C:
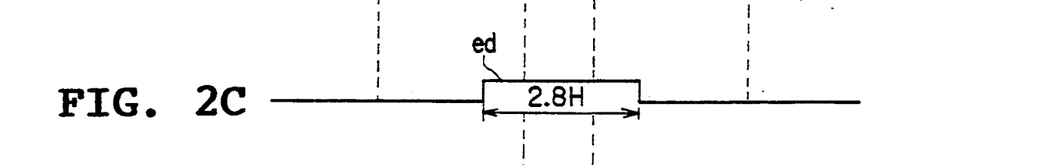

Referring now to FIG. 2B, the marker signal ma is recorded by the marker processing circuit 8 during a period 1.5 [H] commencing 2.65 [H] from the terminus of the track area pcm in which the PCM audio signal is recorded. Accordingly, the marker signal is recorded in an interval commencing 0.35 [H] before the boundary of the areas PCM and VD and terminating 2.65 H before the beginning of the area vd in which the video signal is recorded. With reference also to FIG. 2C, it will be seen that the marker signal ma may be conveniently extracted from the signal reproduced by the head assembly 10 with the use of a window signal ed having a duration of 2.8 [H] which has a rising edge preceding the marker signal ma and a falling edge following that of the marker signal, thus to provide an appropriate time window for recovering the marker signal ma.

Figures 2D, 2E:
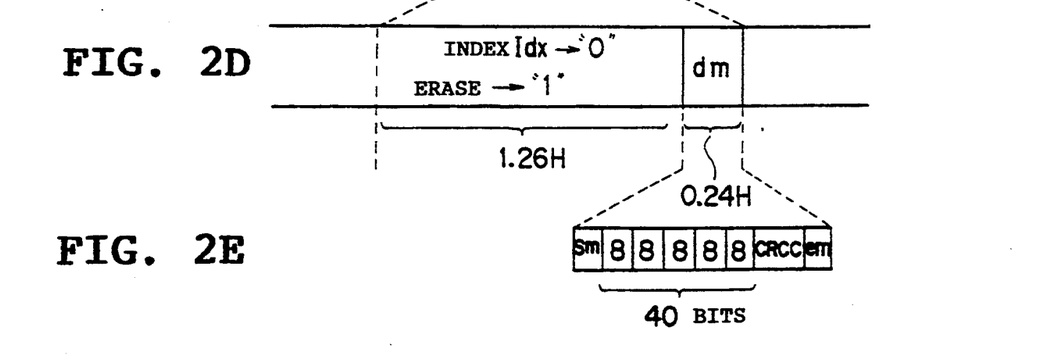

Turning now to FIG. 2D, a format for the marker signal ma is illustrated therein. A first portion of the marker signal extending 1.26 [H] from the beginning thereof along the scanning direction 20 of the head assembly 10 is assigned for the recording of a header portion, in which information such as an Index signal Idx for a respective program (the beginning of which is represented by a "0" value of the index signal) or an erase signal is recorded. The remainder of the marker signal recording area extending for 0.24 [H] is assigned for the recording of a recording date, a recording time or a time code, depending upon the particular track in which the marker signal is recorded. Referring also to FIG. 2E, this portion of the marker signal, designated dm, includes a code start marker sm at the beginning thereof and a code end marker em at the terminus thereof. Between the start and end markers sm and em, five bytes of data are recorded, followed by a CRCC error correction code.

Figure 3:
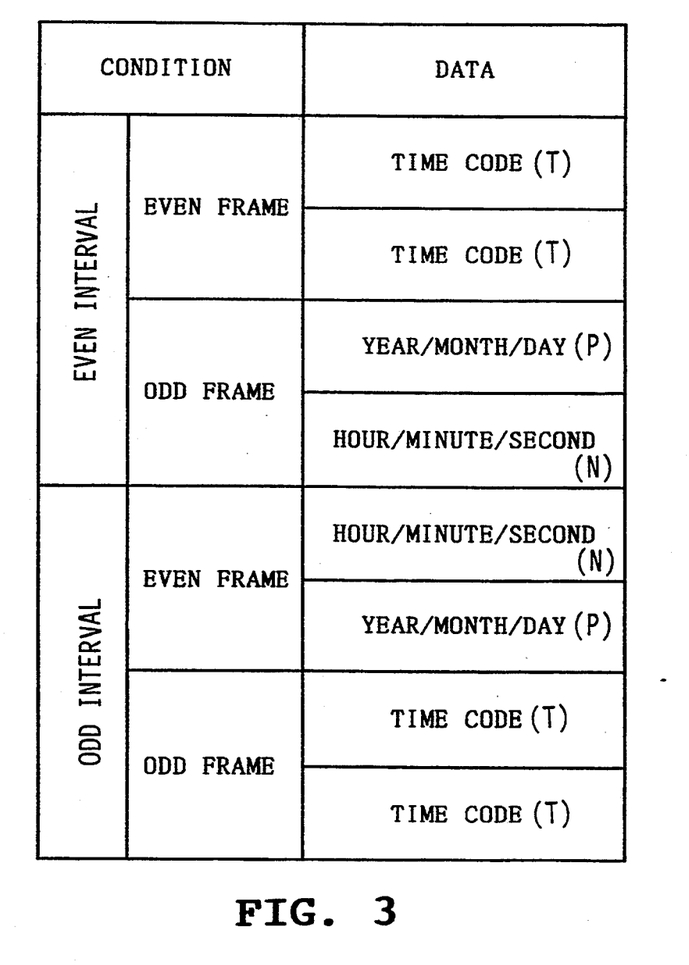
FIG. 3 is a chart summarizing a distribution of different types of ancillary information signals included in the marker signal of FIGS. 2A–2E in sequentially arranged recording tracks, in accordance with a first embodiment thereof.

The chart of FIG. 3 illustrates the distribution of the time code, recording date and recording time data included in the marker signal ma in the various sequentially recorded helical tracks on the magnetic tape 2, in accordance with a first embodiment. As illustrated in FIG. 3, the time code data is recorded in the eight bytes of the portion dm of the marker signal ma in both fields of each even frame during each even interval of four sequential tracks on the tape 2, as well as in both fields of each odd frame during each odd interval of four tracks on the tape 2. The time code data includes an identification signal, together with hour, minute, second and frame signals.

However, during the first field of each odd frame during each even interval, as well as in the second field of each even frame during each odd interval, information indicating the date of recording is recorded in the five bytes of data included within the portion dm of the marker signal ma. The date of recording information includes an appropriate identification signal, together with year, month, day and time information.

Moreover, in the second field of each odd frame during each even interval, as well as in the first field of each even frame of each odd interval, the five bytes of data included in the portion dm of the marker signal ma indicates the time at which the video information was recorded and includes an appropriate identification signal, together with hour, minute and second information.

Figure 4:
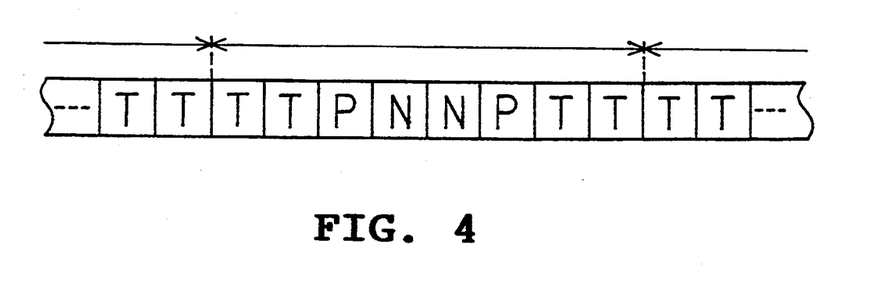
FIG. 4 is a schematic diagram, corresponding with the chart of FIG. 3, illustrating the distribution of the different types of information signals in the sequentially arranged recording tracks.

FIG. 4 schematically illustrates the track-by-track arrangement of the time code, date of recording and time of recording data in accordance with the first embodiment as summarized in the chart of FIG. 3. In FIG. 4, tracks in which the marker signal includes time code information are denoted by the symbol "T", tracks recording a marker signal having date of recording information are denoted by the symbol "P" and tracks recording marker signals including time of recording information are denoted by the symbol "N". It will be seen from FIG. 4 that, by virtue of the recording arrangement as illustrated in the chart of FIG. 3, time code information is recorded in intervals of four adjacent tracks separated by four track intervals in which the date of recording is recorded in the first and fourth tracks, while the time of recording is recorded in the second and third tracks.

Figure 5A:
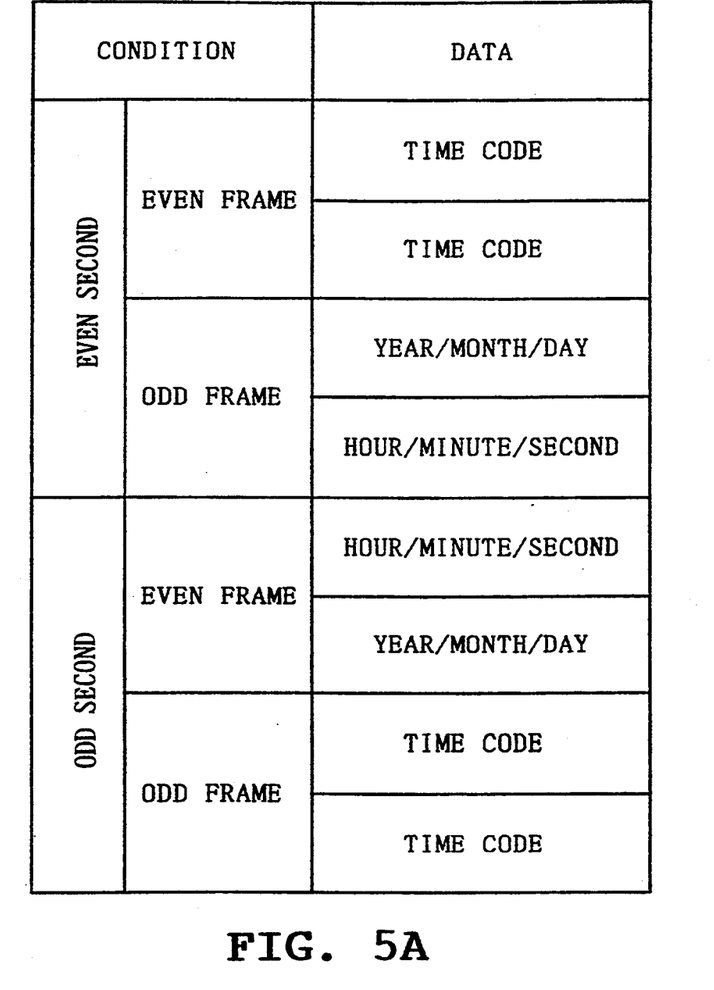
FIGS. 5A and 5B provide, respectively, a chart and an accompanying guide, for summarizing a further distribution of the information signals included in the marker signal of FIGS. 2A–2E in sequentially arranged recording tracks, in accordance with a second embodiment thereof.
Figure 5B:
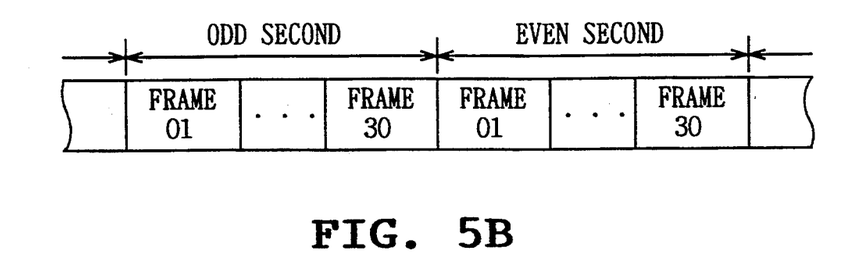

FIG. 5A provides a chart for illustrating the distribution of the time code (T), recording date (P) and recording time (N) data included in the marker signal ma in the sequential recording tracks of the magnetic tape 2, in accordance with a second embodiment. Reference is also made to FIG. 5B which provides a guide for identifying frame numbers during odd and even seconds during each of which, as illustrated in FIG. 5B, thirty frames (each including an odd field and an even field) occur in the case of an NTSC signal. The terms "even numbered" and "odd numbered" designating fields, frames and time intervals herein are used merely for ease of explanation and illustration, and it will be appreciated that these terms are interchangeable.

As indicated by the chart of FIG. 5A, during even frames of each even second, the time code (T) is recorded in the portion dm of the marker signal ma in both fields in adjacent tracks, while the time code is recorded in the portion dm in adjacent tracks during both fields of odd frames during odd seconds. As noted above, the time code data includes an identification signal, as well as hour, minute, second and frame signals. During odd numbered frames of each even second, the date information (P) is recorded in the portion dm during the first field, while the data indicating the time of recording is recorded in the portion md in the second field of each odd numbered frame occurring during each even second, so that date and time of recording information are recorded in adjacent tracks. As noted above, the date of recording information includes an appropriate identification signal, together with year, month, day and time information, while the time information includes an appropriate identification signal, together with hour, minute and second information. Also as indicated in FIG. 5A, during each even frame of each odd second, the time information (N) is recorded in the portion dm of the first field, while the date information (P) is recorded in the portion dm during the second field thereof.

Figure 6A:
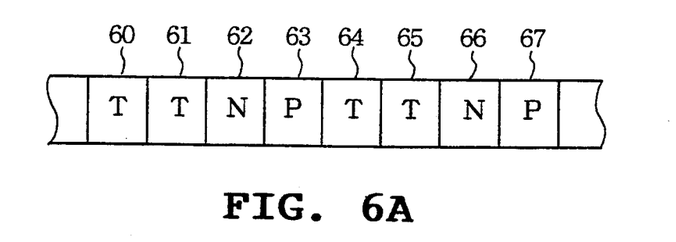
FIGS. 6A and 6B provide schematic diagrams, corresponding with the chart of FIG. 5A, illustrating the distribution of the different types of information signals in the sequentially arranged recording tracks during odd and even seconds, respectively.
Figure 6B:
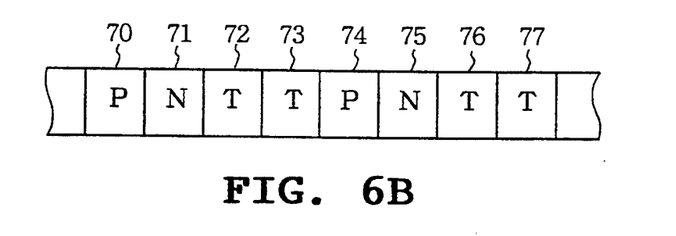

The track-by-track arrangement of the time code, date of recording and time of recording data in accordance with the second embodiment are illustrated schematically, for odd seconds, in FIG. 6A, and for even seconds, in FIG. 6B. In FIG. 6A, it will be seen that during odd seconds fields 60, 61, 64 and 65 constituting the first and second fields of odd numbered frames include the time code signal (T) in the portion dm, while the time information (N) is recorded in the protion dm during the first fields 62 and 66 of each even numbered frame and the date information (P) is recorded in the second fields 63 and 67 of each even numbered frame. With reference to FIG. 6B, it will seen that during each even second, the time code (T) is recorded in the first and second fields 72, 73, 76 and 77 of each even numbered frame, while the date information (P) is recorded in the portion dm during the first field of each odd numbered frame 70 and 74 and the time information (N) is recorded in the portion dm of the second fields 71 and 75 of each odd numbered frame.

The recording configurations illustrated in FIGS. 3, 4, 5A, 5B, 6A and 6B provide the advantage that each of the time code, date of recording information and time of recording information can be reliably reproduced even when the VTR 1 operates in a frame by frame-forwarding mode or in a two-times speed mode.

Figure 9:
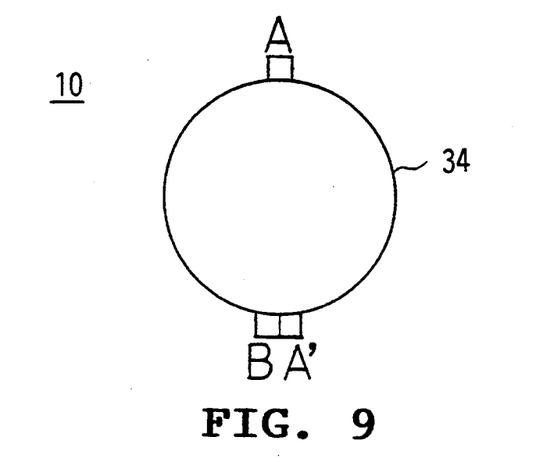
FIG. 9 is a diagrammatic view of a rotary recording head assembly of the VTR embodiment of FIG. 1.
Figure 10:
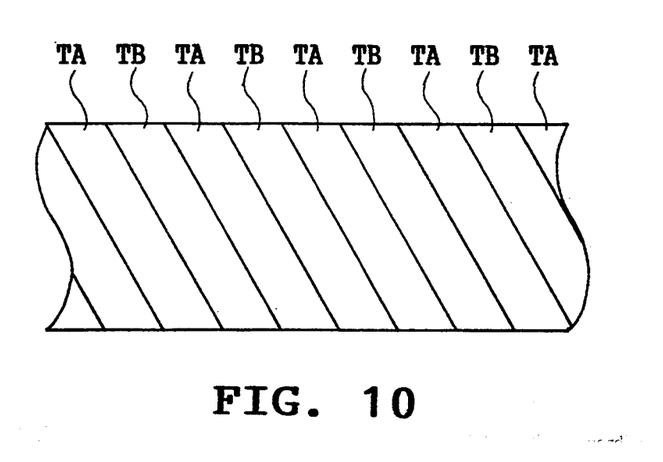
FIG. 10 is a schematic representation of sequentially arranged helical recording tracks formed in a magnetic tape by the head drum of FIG. 9.

The foregoing advantages are illustrated with reference also to FIGS. 7–10. With reference first to FIG. 9, the magnetic head assembly 10 of FIG. 1 is illustrated in greater detail therein. As shown in FIG. 9, the assembly 10 includes a rotary drum 34 which mounts a first magnetic recording head A having a first azimuth angle at a first circumferential position, and a pair of magnetic recording heads B and A' at a circumferential position diametrically opposed to the first position. The head A' has an azimuth angle which is the same as that of head A, while head B has a different azimuth angle. Referring also to FIG. 10, a magnetic tape recorded with the rotary head drum of FIG. 9 is illustrated therein having adjacent recording tracks labeled alternately TA and TB respectively recorded by the heads A and B of the rotary head assembly 10 of FIG. 9. The respective azimuth angles of the heads A and B are selected so that, during reproduction, crosstalk in the reproduced signals produced by each of heads A and B due to the reproduction of signals from adjacent tracks may be minimized.

Figure 7:
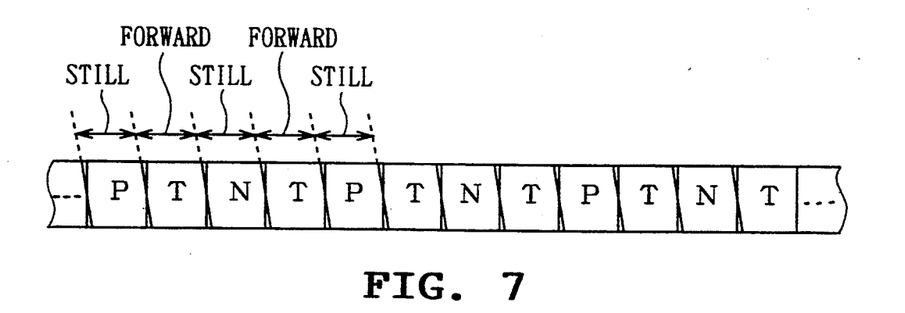
FIGS. 7 and 8 are schematic diagrams for use in illustrating certain advantages provided by the information distribution formats of FIGS. 3, 4, 5A, 5B, 6A and 6B for reproducing the information signals in a frame by frame-forwarding mode and in a two-times speed reproducing mode.
Figure 8:
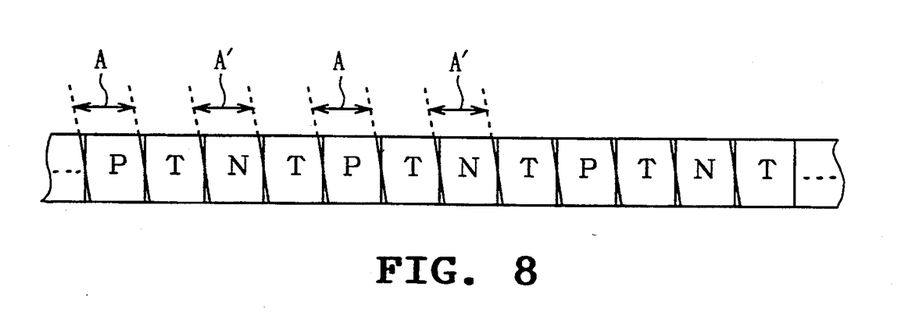

FIGS. 7 and 8 illustrate an arrangement in which the time code signals T are recorded in every other track, while date of recording and time of recording signals P and N are recorded at intervals of every four tracks. If a tape recorded as illustrated in FIG. 7 is reproduced by the rotary head assembly 10 of FIG. 9 in a frame by frame-forwarding mode, as illustrated in FIG. 7, the magnetic heads A and A' having the same azimuth angle are employed, so that the time code data T are not reproduced. However, if a magnetic tape recorded as shown in either FIG. 4 or FIGS. 6A and 6B is reproduced in this manner, the time code data T are readily and accurately reproduced since the time code data are recorded in adjacent tracks.

In the two-times speed mode, which is illustrated in FIG. 8, the heads A and A' are utilized to reproduce every other track, so that once again the time code data T are not reproduced. Where a tape recorded in the manner illustrated in FIG. 4 or in the manner illustrated in FIGS. 6A and 6B is reproduced in the two-time speeds mode, however, since the time code data is recorded in adjacent tracks, the same will be reproduced reliably and accurately.

In the case of the date of recording data P and the time of recording data N recorded in the manner illustrated in FIG. 4 or in the manner illustrated in FIGS. 6A and 6B, it will be seen that the same likewise will be reliably and accurately reproduced even in the frame by frame—forwarding mode as well as in the two-times speed mode, since the order in which the data P and N are recorded in the first and second fields of the odd frame included in the even interval (FIG. 4) or second (FIGS. 6A and 6B) is reversed in the even frame of the odd interval (FIG. 4) or second (FIGS. 6A and 6B).

In the reproduction mode of the VTR 1 of FIG. 1, the circuit 3 demodulates the reproduced video signal supplied by the head assembly 10 in order to generate an output video signal SO which is supplied at an output terminal 26 thereof in a form suitable for monitoring by an external monitoring unit or video display. In addition, the marker processing circuit 8 inputs the marker signal ma from each track reproduced by the head assembly 10 utilizing the window signal ed, as illustrated in FIG. 2C, and then demodulates the marker signal ma. The marker processing circuit 8 identifies the time code data, the date of recording information and the time of recording information based upon the identification signals reproduced with the marker signal ma and outputs this information to the system controlling circuit 4 which stores the same for use selectively in response to commands input by a user via the operation unit 5.

Accordingly, in response to appropriate user commands, the system controlling circuit 4 outputs date of recording information, time of recording information, etc., via an output terminal 30 thereof to a character generator 14 which responds thereto by producing corresponding character signals which it outputs to a first input of an adder 12. The adder 12 has a second input coupled with the output terminal 26 of the circuit 3 to receive the output video signal SO and is operative to superimpose the character signals provided by the character generator 14 on the output video signal SO selectively so that the same may be viewed as part of an image produced with the use of the output video signal SO.

In the alternative, as desired, the user may input an appropriate command with the use of the operation unit 5 so that the circuit 4 inhibits the output of information at its output terminal 30. In the absence of such information, the character generator 14 is inoperative to output character signals to the adder 12. Consequently, the user may also choose to view the output video signals without the date, time or other information superimposed thereon.

Conventional video tape recorders, on the other hand, record date of recording information characters as a part of the image represented by the video signal, so that the date of recording information must be reproduced with the video signal if the same is to be viewed at all. If a user wishes instead not to superimpose date of recording characters on the video signal when making a recording with the use of a conventional video tape recorder, however, no ability is provided to record the date of recording information. In that event, the date of recording cannot be ascertained from the video taped record, so that it is difficult to ascertain the date of recording or to locate the recording of a particular event on the tape.

Accordingly, the video tape recorder of FIG. 1 provides the ability to search a desired recording on the tape by inputting search information, for example, date of recording information in the form of the year, month and day of a recording, or only portions of such information, together with a search command with the use of the operation unit 5. For example, when information indicating a month when a picture was recorded is input by the user, the system controlling circuit 4 supplies an appropriate drive control signal SM to a mechanical driving unit 16 which responds by driving a mechanical tape deck 17 in a fast forwarding mode until the reproduced marker signal contains a month of recording corresponding with that specified by the user, whereupon the search operation terminates.

Figure 11:
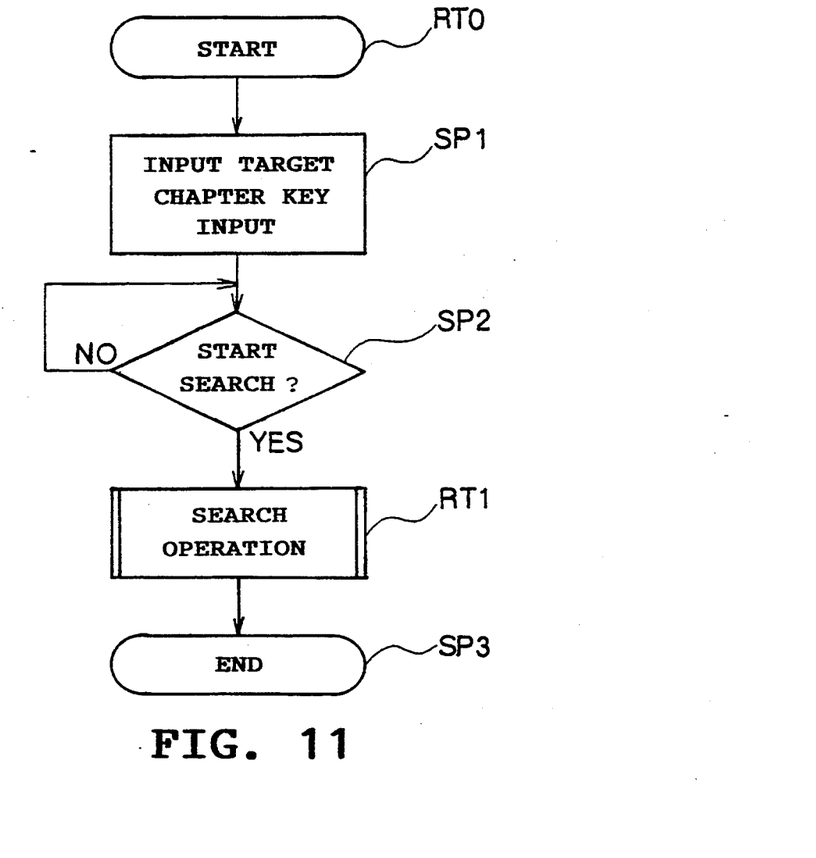
FIG. 11 is a flow chart illustrating a search processing routine of the VTR embodiment of FIG. 1.

The foregoing search processing routine is explained in greater detail with reference to the flow charts of FIGS. 11 and 12. With reference first to FIG. 11, when the VTR 1 enters the search mode, in a step SP1 the system controlling circuit 4 inputs a target chapter "CPTR" representing the search information input by the user by means of the unit 5. The process continues in step SP2 during which the system controlling circuit 4 waits until a search command input signal is received from the operation unit 5 and, once the search command is seen, the system controlling circuit 4 carries out a search operation subroutine RT1 which is illustrated in FIG. 12.

Figure 12:
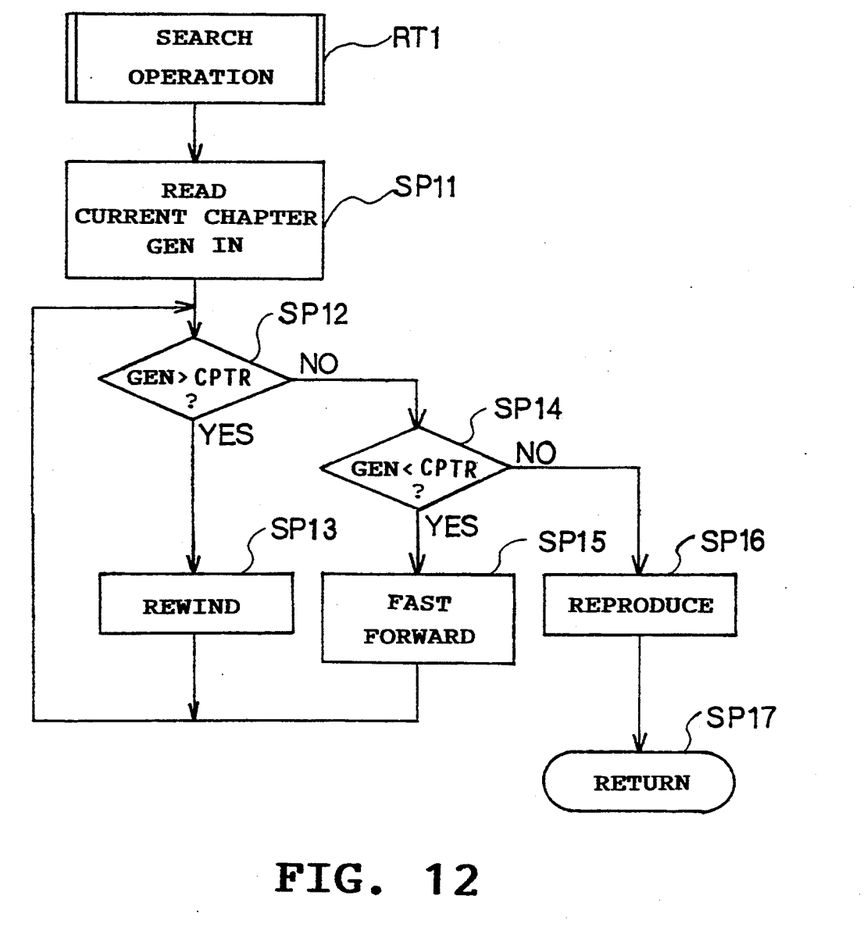
FIG. 12 is a flow chart illustrating a search operation subroutine of the FIG. 11 search processing routine.

Referring now to FIG. 12, in a step SP11 of the search operation subroutine, the system controlling circuit 4 reads a current chapter "GEN" representing the current position of the tape as reflected by the marker signal. Thereupon, in a step SP12 the system controlling circuit 4 determines whether the current chapter "GEN" is larger than the target chapter "CPTR". If so, the program proceeds to a step SP13 in which an appropriate drive control signal SM is supplied to the mechanical driving unit 16 for rewinding the tape, and then the program returns to the step SP12.

If, however, the circuit 4 determines in the step SP12 that the current chapter "GEN" is less than or equal to the target chapter "CPTR", this indicates that the tape has reached or passed the position indicated by the target chapter "CPTR". Thereupon, the program continues to a step SP14 in which it is determined whether the current chapter "GEN" has become smaller than the target chapter "CPTR". If so, the program continues to a step SP15 in which the system controlling circuit 4 supplies a drive control signal SM to the mechanical driving unit 16 for driving the tape in a fast forward mode and the program returns to the step SP12. If, however, it is determined in the step SP14 that the current chapter "GEN" is not less than the target chapter "CPR" this indicates that the current chapter "GEN? now is equal to the target chapter "CPTR". Thereupon, the program continues to a step SP16 in which the system controlling circuit 4 places the VTR 1 in a reproducing mode and terminates the search operation subroutine, so that the overall search operation is terminated in a step SP3 of FIG. 11. Accordingly, thereupon the VTR 1 proceeds to reproduce the signals located at the position accessed by means of the month of recording data input by the user.

Similarly, where the user inputs information indicating a day on which a desired recording was made, the system controlling circuit 4 monitors the reproduced data indicating the year, month and day of recording while the tape is transported in the fast forward mode, as described above, and when the day specified by the user is detected in the monitored data, the VTR1 switches to the reproducing mode. In this manner, the system controlling circuit 4 searches and once found, reproduces the signals recorded on the day specified by the user.

In addition, when the user inputs data for searching a recording based upon a month, day and hour of recording, the system controlling circuit 4 searches and displays a recording made on the specified month, day and hour.

If, however, a corresponding recording specified by the user cannot be found by searching the magnetic tape 2 through to its end, the system controlling circuit 4 provides a display to that effect by means of the character generator 14, and then ends the searching process.

Accordingly, when a video signal is recorded with the use of the VTR 1, information representing the date and time of recording, as well as other useful information, is recorded separately from the video signal. At the time of reproduction, the content of the tape is searched according to the information input by the user, in a simple and straight-forward manner, while enhancing the operational capabilities of the video tape recorder 1.

In the embodiments disclosed hereinabove, time code data, as well as the date and time of recording information, is recorded as a part of the marker signal. However, the present invention is not so limited, and is applicable generally where various types of information are recorded, and a search is carried out with the use of such information.

As described above, according to one feature of the present invention, a predetermined area in a recording track located between a video signal recording area and a PCM recording area thereof, is utilized for recording information useful for searching a recording to be reproduced, in order to provide a magnetic recording and/or reproducing apparatus capable of searching a desired recording in a simple and convenient fashion.

Although specific embodiments of the invention have been described in detail herein with reference to the accompanying drawings, it is to be understood that the invention is not limited to these precise embodiments, and that various changes and modifications may be effected therein by one skilled in the art without departing from the scope or spirit of the invention as defined in the appended claims.

What is claimed is:

1. An apparatus for recording and reproducing an ancillary information signal, a video signal and a PCM signal recorded by a rotary head in a helical track on a magnetic tape, said video signal being recorded in a first portion of said helical track and said PCM signal being recorded in a second portion of said helical track other than said first portion, said ancillary information signal including a date signal indicating a date on which at least one of said PCM signal and said video signal are recorded, comprising:

information generator means for generating said ancillary information signal;

switch means for supplying said PCM signal, said video signal and said ancillary information signal time-divisionally to said rotary head;

switch control means for controlling said switch means to supply said ancillary information signal to said rotary head so that said rotary head is operative to record said ancillary information signal in a third portion of said helical track between said first portion and said second portion thereof;

video playback means for reproducing said video signal from said helical track;

information playback means for reproducing said ancillary information signal from said helical track;

character generator means for generating recording date character signals in response to the date signal included in said reproduced ancillary information signal;

first means for superimposing said recording date character signals on the reproduced video signal; and second means for selectively controlling the superposition of said recording date character signals on said reproduced video signal by said first means.

2. The apparatus of claim 1, wherein said switch control means is operative to control said switch means to supply said ancillary information signal to said rotary head for recording in a guard band region of said helical track.

3. The apparatus of claim 1, wherein said switch control means is operative to control said switch means to supply said ancillary information signal with a header signal to said rotary head for recording in a first plurality of helical tracks formed on said magnetic tape and is further operative to supply time code signals and recording time signals with corresponding header signals as further information signals for recording respectively in second and third pluralities of helical tracks formed on said magnetic tape.

4. The apparatus of claim 3, wherein said switch control means is operative to control said switch means to supply a start marker signal and an end marker signal indicating respective start and end positions of said ancillary information signal and said further information signals to said rotary head for recording in each of the first, second and third pluralities of helical tracks.

5. An apparatus for recording and reproducing an ancillary information signal, a video signal and a PCM signal recorded by a rotary head in at least one helical track on a magnetic tape, said video signal being recorded in a first portion of said at least one helical track and said PCM signal being recorded in a second portion of said at least one helical track other than said first portion, said ancillary information signal including a date signal indicating a date on which at least of one of said PCM signal and said video signal are recorded, comprising:

information generator means for generating said ancillary information signal;

switch means for supplying said PCM signal, said video signal, said ancillary information signal, time code signals and recording time signals time-divisionally to said rotary head;

switch control means for controlling said switch means to supply said ancillary information signal with a header signal to said rotary head for recording in a third portion of said at least one helical track between said first portion and said second portion thereof and in each of a first plurality of helical tracks formed on said magnetic tape and to supply said time code signals and recording time signals with corresponding header signals as further information signals for recording respectively in second and third pluralities of said helical tracks formed on said magnetic tape such that said time code signals are recorded in groups of adjacent helical tracks on said magnetic tape, each group of adjacent helical tracks being separated by a predetermined number of other helical tracks formed on said magnetic tape;

video playback means for reproducing said video signal from said at least one helical track;

information playback means for reproducing said ancillary information signal from said at least one helical track;

character generator means for generating character signals in response to the reproduced ancillary information signal;

first means for superimposing said character signals on the reproduced video signal; and second means for selectively controlling the superposition of said character signals on said reproduced video signal by said first means.

6. An apparatus for recording and reproducing an ancillary information signal, a video signal and PCM signal recorded by a rotary head in at least one helical track on a magnetic tape, said video signal being recorded in a first portion of said at least one helical track and said PCM signal being recorded in a second portion of said at least one helical track other than said first portion, said ancillary information signal including a date signal indicating a date on which at least one of said PCM signal and said video signal are recorded, comprising:

information generator means for generating said ancillary information signal;

switch means for supplying said PCM signal, said video signal and said ancillary information signal time-divisionally to said rotary head;

switch control means for controlling said switch means to supply said ancillary information signal to said rotary head so that said rotary head is operative to record said ancillary information signal in a third portion of said at least one helical track between said first portion and said second portion thereof;

said switch control means being further operative to control said switch means to supply said video signal to said rotary head for recording in a plurality of sequential helical tracks on said magnetic tape including said at least one helical track and to supply date of recording signals to said rotary head for recording in selected ones of said plurality of sequential helical tracks such that each of the selected ones of the tracks is spaced from another thereof at an interval of an odd number of tracks;

video playback means for reproducing said video signal from said plurality of sequential helical tracks;

information playback means for reproducing said ancillary information signal from said at least one helical track;

character generator means for generating character signals in response to the reproduced ancillary information signal;

first means for superimposing said character signals on the reproduced video signal; and second means for selectively controlling the superposition of said character signals on said reproduced video signal by said first means.

7. The apparatus of claim 6, wherein said switch control means is operative to control said switch means to supply time of recording and time code signals to said rotary head for recording in respective ones of said plurality of sequential helical tracks other than said selected ones of said plurality of sequential helical tracks.

8. The apparatus of claim 7, wherein said switch control means is operative to control said switch means to supply the time of recording signals to said rotary head such that said time of recording signals are recorded in further selected ones of said plurality of sequential helical tracks such that each thereof is spaced from another thereof by an interval of an odd number of tracks, each of a plurality of pairs of the selected ones of the tracks recording said date of recording signals being arranged with a corresponding pair of the further selected ones of the tracks recording said time of recording signals in a group of four sequential tracks.

9. The apparatus of claim 8, wherein each group of four sequential tracks is separated from a following group thereof by a predetermined number of tracks recording said time code signals.

10. An apparatus for recording and reproducing an ancillary information signal, a video signal and a PCM signal recorded by a rotary head in at least one helical track on a magnetic tape, said video signal being recorded in a first portion of said at least one helical track and said PCM. Signal being recorded in a second portion of said at least one helical track other than said first portion, said ancillary information signal including a date signal indicating a date on which at least one of said PCM signal and said video signal are recorded, comprising:

information generator means for generating said ancillary information signal;

switch means for supplying said PCM signal, said video signal and said ancillary information signal time-divisionally to said rotary head;

switch control means for controlling said switch means to supply said ancillary information signal to said rotary head so that said rotary head is operative to record said ancillary information signal in a third portion of said at least one helical track between said first portion and said second portion thereof;

said switch control means being further operative to control said switch means to supply said video signal to said rotary head for recording in a plurality of sequential helical tracks on said magnetic tape including said at least one helical track and to supply date of recording signals to said rotary head for recording in first selected ones of the tracks;

video playback means for reproducing said video signal from said plurality of sequential helical tracks;

information playback means for reproducing said ancillary information signal from said at least one helical track;

character generator means for generating character signals in response to the reproduced ancillary information signal;

first means for superimposing said character signals on the reproduced video signal; and second means for selectively controlling the superposition of said character signals on said reproduced video signal by said first means.

11. The apparatus of claim 10, wherein said switch control means is operative to control said switch means to supply time code signals to said rotary head for recording in groups of a plurality of sequential tracks other than said first selected ones of the tracks in which said date of recording signals are recorded.

12. The apparatus of claim 10, wherein the switch control means is operative to control the switch means to supply the date of recording signals for recording in said first selected ones of the tracks such that during a first plurality of predetermined recording intervals the first selected ones of the tracks are recorded at odd numbered track positions and during a second plurality of predetermined recording intervals the first selected ones of the tracks are recorded at even numbered track positions, the first and second pluralities of predetermined recording intervals occurring alternately on said magnetic tape.

13. The apparatus of claim 12, wherein the switch control means is operative to control the switch means to supply time of recording signals to said rotary head for recording in second selected ones of the tracks each being recorded adjacent a respective one of the first selected ones of the tracks to form first pairs of adjacent tracks such that during said first plurality of predetermined recording intervals the second selected ones of the tracks are recorded at even numbered track positions and during said second plurality of predetermined recording intervals the second selected ones of the tracks are recorded at odd numbered track positions.

14. The apparatus of claim 13, wherein the switch control means is operative to control the switch means to supply time code signals for recording in third selected ones of the tracks, said third selected ones of the tracks being arranged as second pairs of adjacent tracks each being arranged alternately on said magnetic tape with said first pairs of adjacent tracks.

15. The apparatus of claim 14, wherein the first and second pluralities of predetermined recording intervals are each substantially one second in duration.

* * * * *